(12) United States Patent
Zenzen et al.

(10) Patent No.: US 11,536,331 B2
(45) Date of Patent: Dec. 27, 2022

(54) DISC BRAKE, DISC BRAKE SYSTEM, AND PARKING BRAKE SYSTEM

(71) Applicant: ZF Active Safety GmbH, Koblenz (DE)

(72) Inventors: Guido Zenzen, Macken (DE); Frank Wilhelm Madzgalla, Koblenz (DE); Christian Schroeter, Sinzig (DE)

(73) Assignee: ZF Active Safety GmbH, Koblenz (DE)

( * ) Notice: Subject to any disclaimer, the term of this patent is extended or adjusted under 35 U.S.C. 154(b) by 19 days.

(21) Appl. No.: 16/630,828

(22) PCT Filed: Jul. 5, 2018

(86) PCT No.: PCT/DE2018/100617
§ 371 (c)(1),
(2) Date: Jan. 13, 2020

(87) PCT Pub. No.: WO2019/015715
PCT Pub. Date: Jan. 24, 2019

(65) Prior Publication Data
US 2020/0141456 A1 May 7, 2020

(30) Foreign Application Priority Data

Jul. 19, 2017 (DE) ...................... 10 2017 116 323.9

(51) Int. Cl.
*F16D 55/228* (2006.01)
*F16D 55/227* (2006.01)
(Continued)

(52) U.S. Cl.
CPC ............ *F16D 55/227* (2013.01); *B60T 1/065* (2013.01); *B60T 13/58* (2013.01); *B60T 13/746* (2013.01);
(Continued)

(58) Field of Classification Search
CPC ...... F16D 55/226; F16D 55/228; F16D 65/02; F16D 65/14; F16D 65/18
(Continued)

(56) References Cited

U.S. PATENT DOCUMENTS 5,090,518 A * 2/1992 Schenk ..................... B60T 8/00
188/157
6,000,506 A * 12/1999 Warwick ............... F16D 55/228
188/1.11 W
(Continued)

FOREIGN PATENT DOCUMENTS

DE 9014039 U1 2/1992
DE 69204062 T2 2/1996
(Continued)

*Primary Examiner* — Christopher P Schwartz
(74) *Attorney, Agent, or Firm* — Robert James Harwood

(57) ABSTRACT

The invention relates to a disc brake, comprising a brake carrier, a brake caliper, brake shoes, and an actuating piston. The brake carrier has at least one mounting point for mounting on a vehicle. The actuating piston is displaceably accommodated on the brake caliper and is actuatable for carrying out a service brake function of the disc brake. At least one further actuating piston is provided, which in the direction of its longitudinal axis is displaceably accommodated on the brake caliper. For carrying out the service brake function, the at least two actuating pistons are actuatable, and for carrying out a parking brake function, one of the actuating pistons is actuatable. The invention further relates to a disc brake system and a parking brake system.

15 Claims, 4 Drawing Sheets

(51) Int. Cl.
*B60T 1/06* (2006.01)
*B60T 13/58* (2006.01)
*B60T 13/74* (2006.01)
*F16D 65/00* (2006.01)
*F16D 65/18* (2006.01)
*F16H 25/20* (2006.01)
*F16D 55/00* (2006.01)
*F16D 121/04* (2012.01)
*F16D 121/24* (2012.01)
*F16D 125/40* (2012.01)

(52) U.S. Cl.
CPC ..... *F16D 65/0056* (2013.01); *F16D 65/0068* (2013.01); *F16D 65/0087* (2013.01); *F16D 65/183* (2013.01); *F16H 25/20* (2013.01); *F16D 2055/0008* (2013.01); *F16D 2055/0016* (2013.01); *F16D 2121/04* (2013.01); *F16D 2121/24* (2013.01); *F16D 2125/40* (2013.01); *F16H 2025/2081* (2013.01)

(58) Field of Classification Search
USPC .............................. 188/72.1, 72.3, 156–164
See application file for complete search history.

(56) References Cited

U.S. PATENT DOCUMENTS

| | | | | |
|---|---|---|---|---|
| 8,205,725 B2* | 6/2012 | Sakashita | ............ | F16D 65/568 188/162 |
| 9,644,693 B2* | 5/2017 | Chelaidite | ............ | F16D 55/226 |
| 9,803,709 B2* | 10/2017 | Misumi | ............ | F16D 65/092 |
| 9,989,114 B2* | 6/2018 | Chelaidite | ............ | F16D 55/22 |
| 10,502,277 B2* | 12/2019 | Masuda | ............ | F16D 65/18 |
| 2004/0159509 A1* | 8/2004 | Chang | ............ | F16D 65/568 188/156 |
| 2006/0124404 A1* | 6/2006 | Morais | ............ | F16D 55/228 188/71.1 |
| 2007/0062764 A1* | 3/2007 | Takahashi | ............ | B60T 13/746 188/1.11 E |
| 2009/0236187 A1* | 9/2009 | Bach | ............ | F16D 65/095 188/72.5 |
| 2012/0325597 A1* | 12/2012 | Giering | ............ | F16D 65/14 188/72.3 |
| 2015/0203079 A1* | 7/2015 | Sekiguchi | ............ | F16H 25/125 188/72.1 |
| 2017/0130788 A1* | 5/2017 | Noguchi | ............ | F16D 55/226 |
| 2018/0031060 A1* | 2/2018 | Huang | ............ | B60T 13/588 |

FOREIGN PATENT DOCUMENTS

| | | |
|---|---|---|
| DE | 10054474 C1 | 2/2002 |
| DE | 102011117437 | 5/2013 |
| WO | 9905011 A2 | 2/1999 |
| WO | 2015098780 A1 | 7/2015 |
| WO | 2015098781 A1 | 7/2015 |
| WO | 2015174434 A1 | 11/2015 |
| WO | 2017032988 A1 | 3/2017 |

* cited by examiner

DISC BRAKE, DISC BRAKE SYSTEM, AND PARKING BRAKE SYSTEM

CROSS-REFERENCE TO RELATED APPLICATION

This application is a national stage of International Application No. PCT/DE2018/100617, filed Jul. 5, 2018, the disclosure of which is incorporated herein by reference in its entirety, and which claimed priority to German Patent Application No. 102017116323.9, filed Jul. 14, 2017, the disclosure of which is incorporated herein by reference in its entirety.

TECHNICAL FIELD

The invention relates to a disc brake having a brake carrier, a brake caliper, brake shoes, and an actuating piston. The invention further relates to a disc brake system and a parking brake system.

BACKGROUND

A disc brake of the type discussed here is known from WO 99/05011 A1, in which it is used as a vehicle brake. A brake carrier, a brake caliper, brake shoes, and an actuating piston are provided in the disc brake. The brake carrier has at least one mounting point for mounting on a vehicle. The brake caliper is guided on the brake carrier and forms a receiving space for a brake disc, the receiving space having two brake sides with regard to the brake disc. The brake shoes are associated with the brake sides and are supported on the brake carrier against braking forces. The actuating piston in the direction of its longitudinal axis is displaceably accommodated on the brake caliper, and can be actuated hydraulically or by means of an electric motor. The disc brake carries out a service brake function as a result of the hydraulic actuation of the actuating piston. The actuating piston is actuatable by the electric motor for carrying out a parking brake function.

SUMMARY

It is an object of the invention to provide a disc brake having features stated at the outset, which on the one hand includes the above-described concept of the combination of a service brake function and a parking brake function, and on the other hand is refined along the lines of a high-performance brake. A further aim is to provide a disc brake system and a parking brake system that are suitable for the use of such a high-performance brake.

This object is achieved with a disc brake having the features of claim 1. To achieve the object, in addition a disc brake system having the features of claim 15 and a parking brake system having the features of claim 16 are proposed. Advantageous embodiments and/or configurations and/or aspects of the invention result from the subclaims, the following description, and the figures.

A basic disc brake has a brake carrier, a brake caliper, brake shoes, and an actuating piston. The brake carrier has at least one mounting point for mounting on a vehicle. For example, the mounting point has a through opening, in particular a through borehole, or a blind hole, in particular a blind borehole, or is formed therefrom. The brake caliper is guided on the brake carrier, and has or forms a receiving space for a brake disc, or at least for a circular section or a circular segment of a brake disc, the receiving space has two brake sides with regard to the brake disc. The brake shoes are associated with the brake sides and supported on the brake carrier against braking forces. The actuating piston in the direction of its longitudinal axis is displaceably accommodated on the brake caliper, and is actuatable for carrying out a service brake function of the disc brake. In addition, the actuating piston is actuatable by means of an electric motor for carrying out a parking brake function of the disc brake.

According to one embodiment of the disc brake, at least one further actuating piston is provided, which in the direction of its longitudinal axis is displaceably accommodated on the brake caliper, wherein for carrying out the service brake function, the at least two actuating pistons are actuatable, and for carrying out the parking brake function, one of the actuating pistons is actuatable, which for this purpose is actuated or actuatable by means of the electric motor. In this way, a measure along the lines of a high-performance brake is taken, since the at least two actuating pistons may be used for carrying out the service brake function, and thus, the force of the at least two actuating pistons is available for service braking. At the same time, it has been found that for carrying out the parking brake function, it is sufficient to make use of one of the actuating pistons, in particular only one of the actuating pistons. This is because the aim of the parking brake function is to hold a vehicle equipped with the disc brake at a standstill, and in this regard, the vehicle is already stopped or at least essentially stopped beforehand.

The term "service brake function" is understood in particular to mean a function of the disc brake via which the vehicle is equipped with the disc brake is braked and/or may be braked to a standstill during operation, for example during travel. Such service braking may be initiated by the vehicle driver, for example by actuating the brake pedal, or an automatic driving and/or braking control, such as adaptive cruise control.

The term "parking brake function" is understood in particular to mean a function of the disc brake via which a vehicle equipped with the disc brake is held at a standstill when the parking brake function takes place. The aim is to prevent the vehicle from inadvertently rolling away, also when the vehicle is on an inclined roadway. The parking brake function is also referred to below as hand brake function. In addition, the term "hand brake function" is used below as a synonym for the term "parking brake function." The parking brake function may, in principle, also be used for emergency braking of the vehicle. The parking brake function, therefore also implies an emergency brake function.

In one possible embodiment of the disc brake, on at least one of the brake sides, at least two of the brake shoes are spaced apart from one another, and in each case, one of the actuating pistons is associated with the at least two brake shoes. In particular, the spaced-apart brake shoes are independently, for example separately, removable and/or, for example, separately actuatable. Due to the separate arrangement between the two brake shoes, a space is to be provided via which cooling of the brake disc during a braking operation is facilitated. During the braking operation, a friction area of the brake disc, which is initially in frictional contact with one of the two brake shoes, does not come into frictional contact with the other of the two brake shoes until the space has been passed by. Thus, over a period of time, even if it is very short, the stated friction area of the brake disc experiences no further friction stress, and thus no further heating. Any structural changes in the brake disc are counteracted by this measure. In addition, possible vibration excitation of the brake shoes is thus counteracted. In this regard, the aim is to take this measure along the lines of a high-performance brake.

In addition, at least two of the brake shoes may be spaced apart from one another, on the other brake side. In particular, it is provided that on each of the two brake sides, at least two of the brake shoes are spaced apart from one another, and one of the actuating pistons is associated with the brake shoes of one of the brake sides. For example, it is provided that the brake caliper is displaceably guided on the brake carrier by at least one, preferably two, guide elements. In this case, the guide elements may be situated between the brake shoes of the respective brake side. A compact design of the disc brake is thus facilitated. For example, the guide elements are situated in the space between the actuating pistons of the respective brake side. The guide elements, as guide bolts or the like, may be designed as a component that carries out a guiding function.

It is suitable for the actuating pistons to be situated on the brake caliper symmetrically with respect to an axial center plane of the brake carrier. It is also suitable for the guide elements to be situated in the axial center plane. Furthermore, it is suitable for the guide elements to be spaced apart from one another in the radial direction with respect to the center axis of the disc brake. A symmetrical force distribution during the service braking is facilitated due to these geometric relationships. In this regard, the aim is also to take these measures along the lines of a high-performance brake. The center axis is understood in particular to mean the longitudinal axis that extends in the center with respect to the brake carrier and/or the brake caliper.

High braking forces may be transmitted from the brake caliper to the brake carrier by the at least two guide elements. As a result of the two guide elements being spaced apart from one another in the radial direction with respect to the center axis of the disc brake, possible tilting due to lateral tipping of the brake caliper with respect to the brake carrier is counteracted during a parking brake function. This takes place against the background that during the parking brake function, only one of the actuating pistons is actuated, and an asymmetrical force distribution may thus take place.

In another embodiment of the disc brake, it is provided that the brake caliper is designed as a floating frame. A measure is thus also taken along the lines of a high-performance brake, since the frame design of the brake caliper facilitates absorption of high braking forces. To implement the parking brake function at the disc brake with a preferably compact arrangement of the component necessary for this purpose, it is suitable for the electric motor to be situated between the actuating pistons. It is also suitable for the longitudinal axis of the electric motor and/or an output shaft of the electric motor and the longitudinal axis of the actuating piston that is actuatable by the electric motor to be axially offset relative to one another, in particular situated axially parallel to one another. For example, it is provided that the electric motor engages with an open space of the brake caliper, in particular between the actuating pistons. For example, it is also provided that the longitudinal axis of the electric motor and/or the output shaft of the electric motor coincide(s) or essentially coincide(s) with the center axis of the disc brake. The center axis is understood in particular to mean the longitudinal axis that extends in the center with respect to the brake carrier and/or the brake caliper.

To allow the one actuating piston to be actuated by means of the electric motor and thus to allow the parking brake function to be carried out, according to one embodiment it is provided that the electric motor is operatively connectable to the one actuating piston via a screw gear and/or a lifting gear, in particular a spindle lifting gear. A rotational motion carried out by the output shaft of the electric motor is thus converted into a translational motion for actuating the one actuating piston. For example, the one actuating piston is designed as a hollow piston that is open on one side, and that with a closed side faces the associated brake side; the screw gear or the lifting gear is at least partially situated in the interior space of the one actuating piston. As a result, the screw gear or lifting gear is compactly accommodated in the disc brake.

The service brake function of the disc brake may thus be implemented by hydraulically actuating the actuating pistons to carry out the service brake function. The service brake function of the disc brake is then carried out by hydraulic actuation of the actuating pistons. For this purpose, it may be provided that, for example, the interior space of the one actuating piston, which is utilizable for parking braking, forms a hydraulic chamber. A high level of component integrity is thus achieved, since the interior space of the one actuating piston assumes a dual function, namely, is used as a receiving space for the screw gear or the lifting gear, and serves as a hydraulic chamber. In principle, the other actuating piston may also be designed as a hollow piston whose interior space serves as a hydraulic chamber.

In one possible embodiment of the disc brake, the electric motor and the screw gear or the lifting gear may be in drive connection with one another via a reduction gear. The reduction gear may be designed as a planetary gear, strain wave gear, eccentric disc gear, or swash plate gear. These types of gears are compact, and have good efficiency with a low weight.

The reduction gear may also have a one-stage or also multi-stage, in particular two-stage, design. To save installation space, a two-stage gear may be provided whose one-stage is formed by one of the above-mentioned gear types having a reduction in the range of 50:1, to which a second stage having a reduction in the range of 4:1 is connected upstream or downstream, so that an overall reduction in the range of 200:1 is achieved. For a mufti-stage reduction gear, in particular a two-stage reduction gear, the gear stage with the lower reduction may be designed as a simple spur gear or as a belt gear, in particular as a toothed belt gear. Use of a belt gear and/or toothed belt gear assists with the decoupling of noise between the driving electric motor and the other parts of the disc brake, and thus facilitates a comfortable and quiet braking operation.

The electric motor and the reduction gear may be designed as an independently operable subassembly which in particular is standardized and combinable with various disc brakes of a design type. This increases the production volume of such a motor/gear unit, which is favorable for the unit cost. In addition, the motor/gear unit designed as an independent assembly allows simple mounting on the brake caliper of the disc brake in any given angular position, so that spatial limitations at the installation point of the disc brake may be taken into account by appropriately positioning the subassembly differently.

According to one possible embodiment of the disc brake, it is provided that the screw gear has or forms a spindle/nut arrangement, and has a threaded spindle and a nut element that meshes therewith. In one embodiment of the spindle/nut arrangement, the threaded spindle is displaceably fixed with respect to the brake caliper in the direction of the longitudinal axis of the spindle/nut arrangement and is rotatable about the longitudinal axis of the spindle/nut arrangement, and the nut element is rotationally fixed with respect to the one actuating piston that is used for carrying out the parking brake function and is displaceable in the direction of the longitudinal axis of the one actuating piston, so that the nut element is translationally moved either into contact with the one actuating piston or away from the one actuating piston due to a rotational motion of the threaded spindle, depending on its rotational direction. The screw gear thus has a technically simple implementation. For example, for this purpose, the threaded spindle is displaceably fixed in the direction of the longitudinal axis of the spindle/nut arrangement and is supported or held on the brake caliper so as to be rotatable about the longitudinal axis of the spindle/nut arrangement, and by means of at least one connecting element, for example, the nut element is held so that it is rotatably fixed with respect to the one actuating piston, and displaceable in the direction of the longitudinal axis of the one actuating piston.

The screw gear may also be implemented in a technically simple manner when, according to another embodiment of the spindle/nut arrangement, the nut element is displaceably fixed with respect to the brake caliper in the direction of the longitudinal axis of the spindle/nut arrangement and is rotatable about the longitudinal axis of the spindle/nut arrangement, and the threaded spindle is rotatably fixed with respect to the one actuating piston and is displaceable in the direction of the longitudinal axis of the one actuating piston, so that the threaded spindle is translationally moved either into contact with the one actuating piston or away from the one actuating piston due to a rotational motion of the nut element, depending on its rotational direction. For example, for this purpose, the nut element is displaceably fixed in the direction of the longitudinal axis of the spindle/nut arrangement and is supported or held on the brake caliper so as to be rotatable about the longitudinal axis of the spindle/nut arrangement, and by means of at least one connecting element, for example, the threaded spindle is rotatably fixedly held with respect to the one actuating piston and is displaceably held in the direction of the longitudinal axis of the one actuating piston.

It is suitable for the thread of the spindle/nut arrangement to be self-locking. As a result, the actuating piston, which is actuated by the electric motor, is held in the particular position in which it is brought by the spindle/nut arrangement. Due to the self-locking mechanism, the position of the nut element on the threaded spindle is maintained until the threaded spindle is rotated by the electric motor. A separate lock for fixing the one actuating piston in the setting position brought about by the electric motor may be dispensed with.

According to one aspect of the invention, a disc brake system for a vehicle is provided. The disc brake system includes the above-described disc brake and a brake disc. In particular, the brake disc is accommodated in the receptacle of the brake caliper of the disc brake, so that the brake sides of the receiving space face a respective flat side of the brake disc.

According to another aspect of the invention, a parking brake system for a vehicle is provided. The parking brake system has the above-described disc brake and/or the above-described disc brake system, which utilizes the above-described electric motor for carrying out a parking brake function or a hand brake function.

One possible embodiment of the parking brake system includes an electronic control unit for controlling the electric motor, the control unit and the electric motor being designed to set a braking force, exerted by the at least one associated brake shoe, according to one or more default values, in particular to set a braking force in a continuously variable manner, to carry out parking braking. For example, the default values may contain or be based on information concerning the inclination of the roadway and/or the friction coefficient of the road surface and/or the instantaneous driving or standstill state of the motor vehicle and/or parameters of the motor vehicle such as the load state. Controlled setting of the braking force exerted by the at least one associated brake shoe is thus made possible, and braking force metering, for example for comfortable starting of the motor vehicle, in particular on an inclined roadway, may be carried out.

BRIEF DESCRIPTION OF THE FIGURES

Further particulars and features of the invention result from the following description of one exemplary embodiment with reference to the drawings, which show the following.

DETAILED DESCRIPTION

Figure 1:
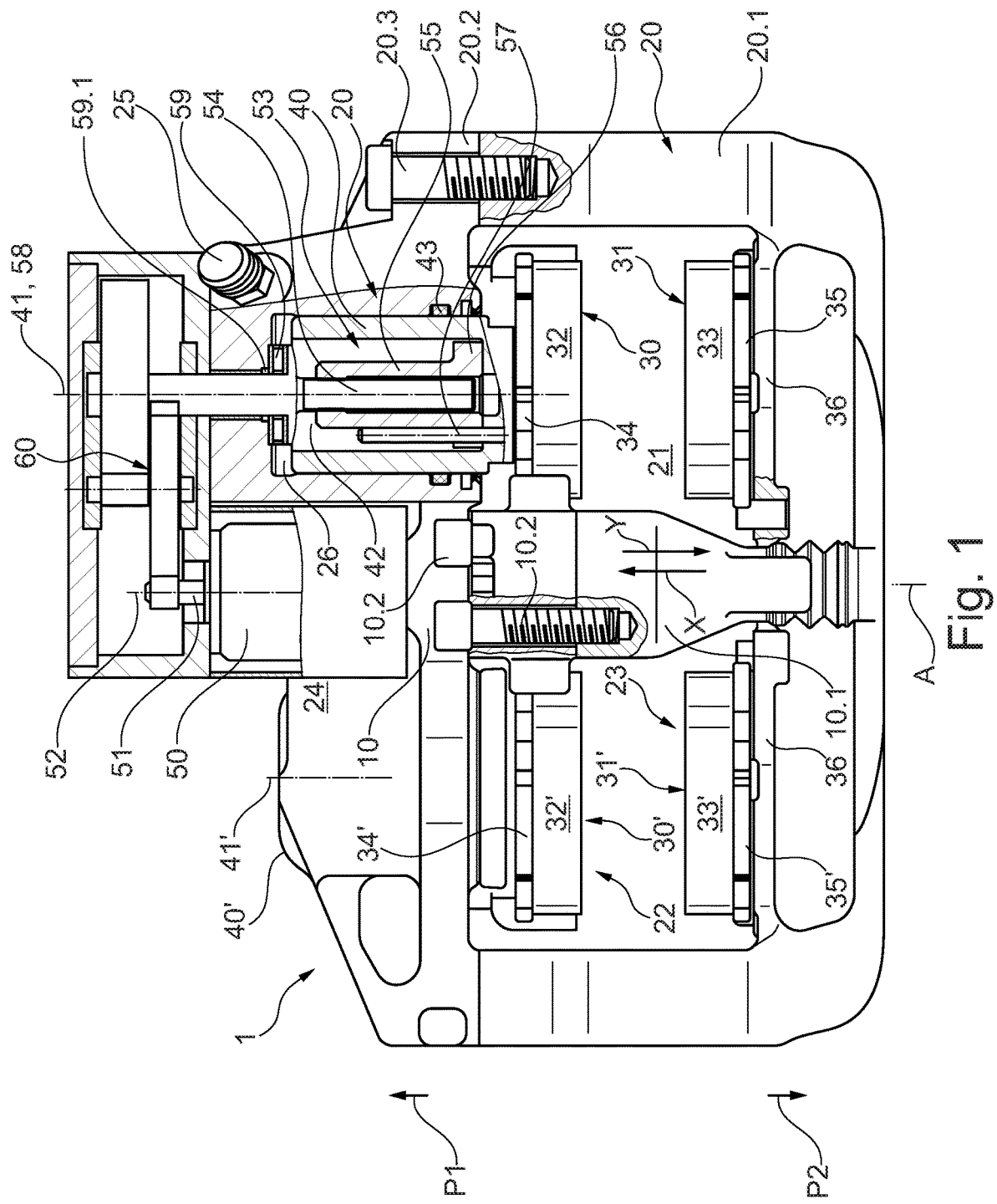
FIG. 1 shows one possible embodiment of a disc brake in a top view.
Figure 2:
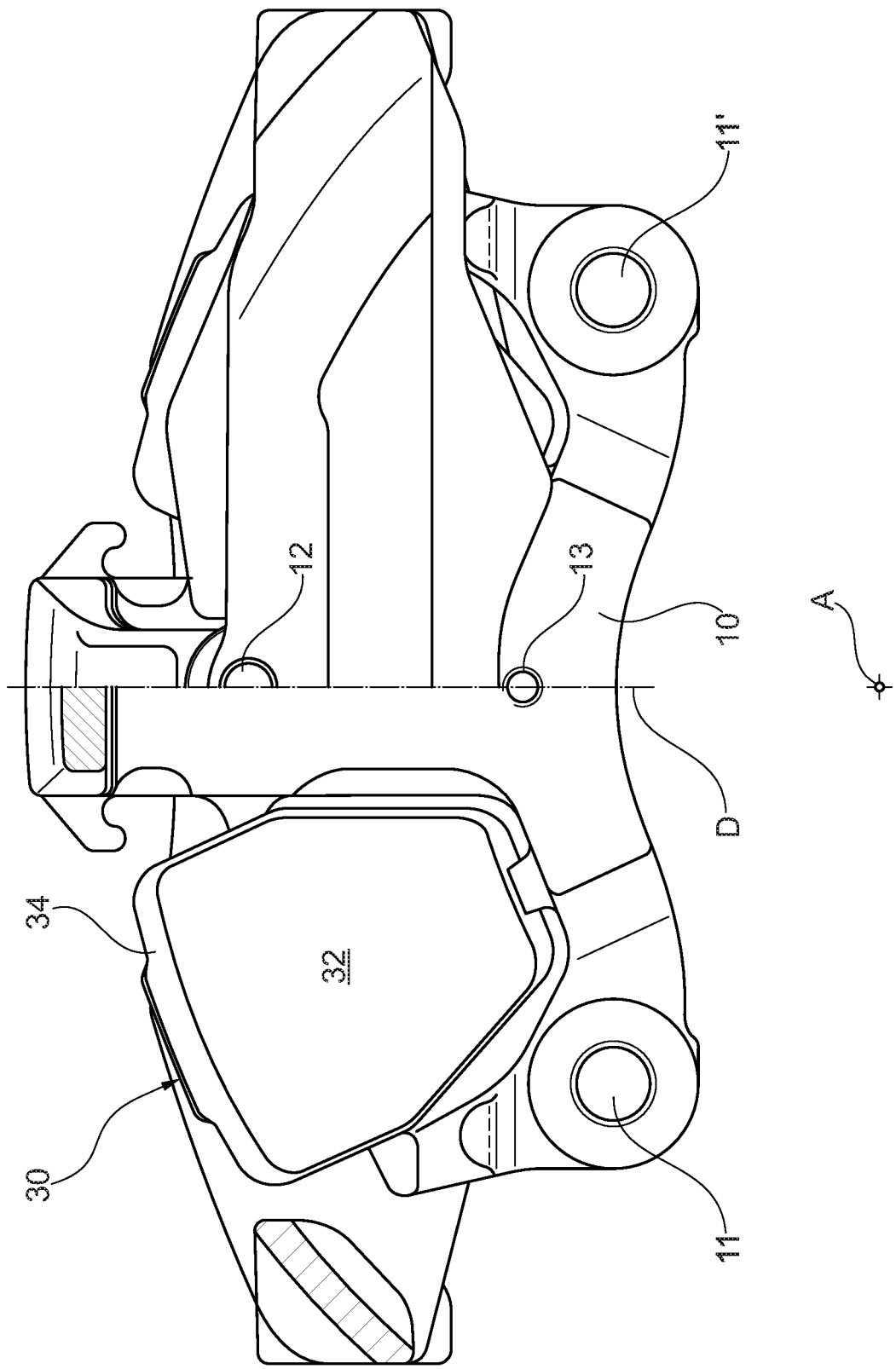
FIG. 2 shows a portion of the disc brake according to FIG. 1 as a view in the direction of the arrow X in FIG. 1.
Figure 3:
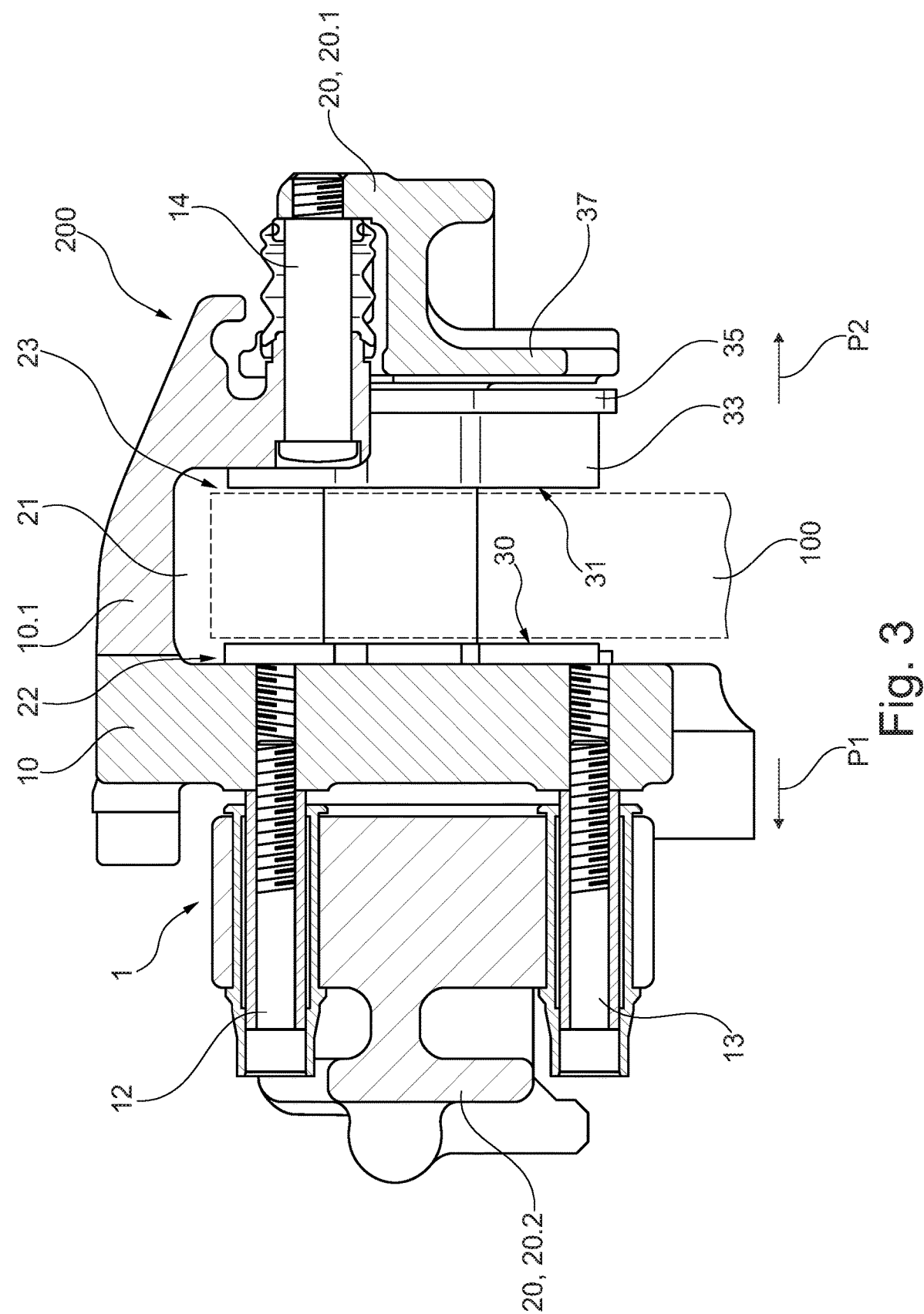
FIG. 3 shows the disc brake according to FIG. 1 in a section perpendicular to the plane of the drawing along the center axis A of the disc brake.
Figure 4:
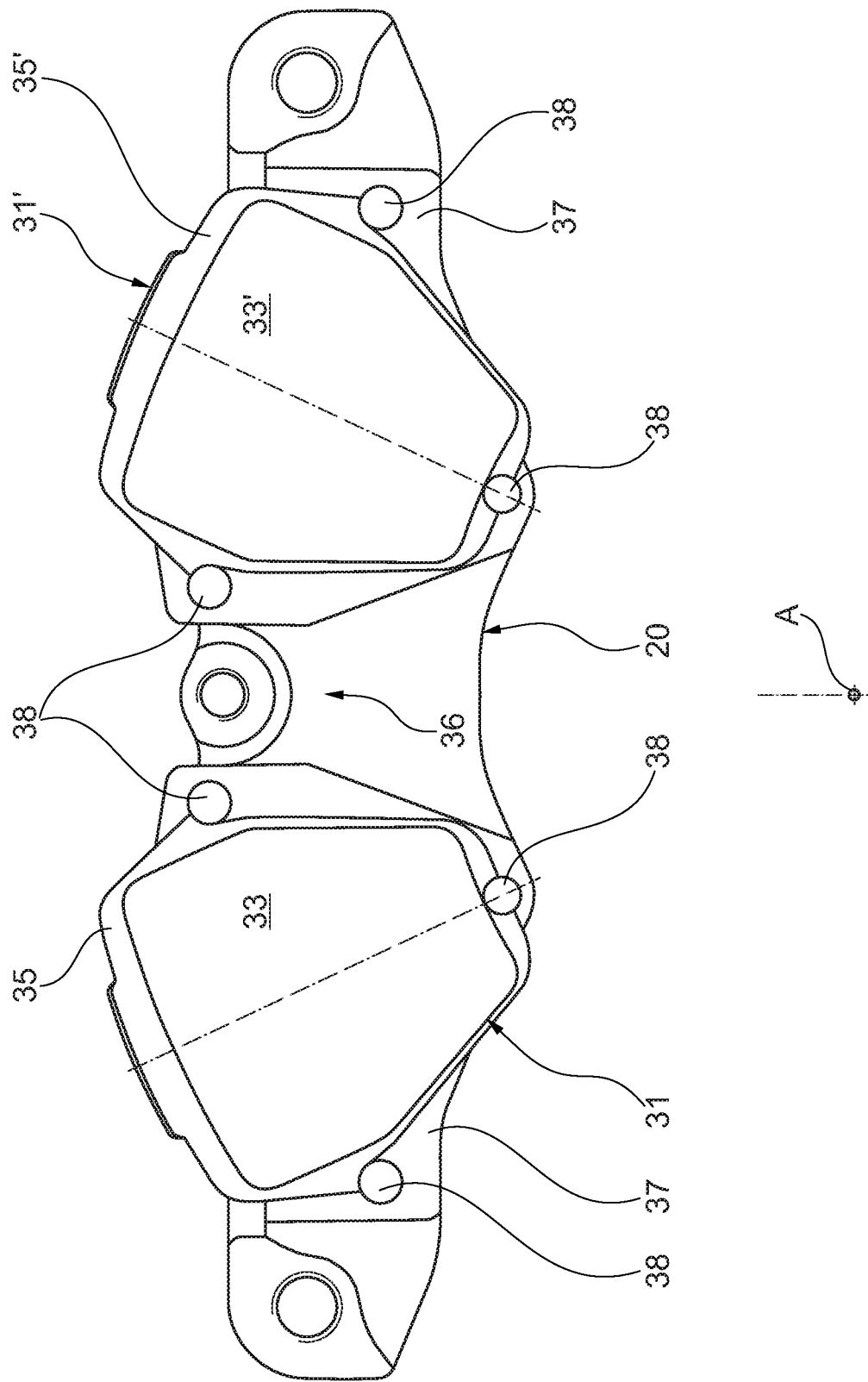
FIG. 4 shows a portion of the disc brake according to FIG. 1 as a view in the direction of the arrow Y in FIG. 1.

FIGS. 1 through 4 show schematic illustrations of a disc brake 1. The disc brake 1 is a vehicle brake, for example, and may be used in a motor vehicle, for example a passenger vehicle or a truck. FIG. 1 shows the disc brake 1 in a top view, illustrating individual components of the disc brake 1 in a partial sectional view. FIGS. 2 and 4 each show a different view of a portion of the disc brake 1. FIG. 3 shows the disc brake 1 in a sectional illustration. In addition to the disc brake 1, a brake disc 100 schematically indicated by way of example is illustrated in FIG. 3. The brake disc 100 and the disc brake 1 form, for example, a disc brake system 200 or at least integral parts of the disc brake system 200.

As is apparent in particular from FIG. 1, the disc brake 1 includes a brake carrier 10, a brake caliper 20, multiple brake shoes 30, 30',31, 31', and an actuating piston 40. A region of the actuating piston 40 is shown in a partial sectional view in FIG. 1. The brake carrier 10 is stationarily mountable with respect to a vehicle (not illustrated in FIGS. 1 through 4). For this purpose, the brake carrier 10 has at least one, for example two mounting points 11, 11' for mounting on the vehicle. The mounting points 11, 11' may be formed by a through hole or a through borehole, or a blind hole, or a blind borehole, in particular a threaded hole (FIG. 2).

The brake caliper 20 is movably guided on the brake carrier 10 in the direction of the center axis A of the disc brake 1. The brake caliper 20 forms a receiving space 21 for the brake disc 100, the receiving space 21 having two brake sides 22, 23 with regard to the brake disc 100, as is apparent in particular from FIGS. 1 and 3. At least one circular section or circular segment of the brake disc 100 is preferably accommodated by the receiving space 21. For example, for this purpose the brake caliper 20 may overlap the brake disc 100. The brake caliper 20 may have a multi-part, for example a two-part, design. For example, the brake caliper 20 has at least two brake caliper sections 20.1, 20.2 that are mounted opposite one another by means of at least one mounting element 20.3, in particular a screw bolt. The brake carrier 10 may also have a multi-part, for example a two-part, design. For example, the brake carrier 10 has a bridge section 10.1 that is fastened to the brake carrier 10 by means of at least one connecting element 10.2 and overlaps the brake disc 100. A portion of the brake caliper 20 may be connected thereto.

With regard to one possible installation state of the disc brake 1 on the vehicle, in the following discussion, the brake side 22 is also referred to as a vehicle inner side, and the brake side 23 is also referred to as a vehicle outer side. In this regard, the brake disc 100 is used, for example, as a partition component for differentiating between the vehicle inner side and the vehicle outer side. Components of the disc brake 1 that are situated in the direction according to arrow P1, starting from the brake side 22, are thus to be associated with the vehicle inner portion, and components that are situated in the direction according to arrow P2, starting from the brake side 23, are to be associated with the vehicle outer portion of the disc brake 1 (FIGS. 1 and 3).

The disc brake 1 may be utilized as a high-performance brake. For this purpose, the brake caliper 20 is preferably designed as a floating frame. In addition, on both the brake sides 22, 23 at least two of the brake shoes 30, 30',31, 31' are respectively spaced apart from one another (FIG. 4). In particular, the brake shoes 30 and 30' are associated with the brake side 22, and the brake shoes 31 and 31' are associated with the brake side 23, as is apparent in particular from FIG. 1. Due to a separate arrangement between the brake shoes 30, 30' of the brake side 22 and between the brake shoes 31, 31' of the brake side 23, in each case a space 36 or intermediate area is preferably formed that is free of a friction lining 32, 32',33, 33' and therefore exerts no braking action during a braking operation.

Under the aspect of the high-performance brake, the disc brake 1 preferably has at least one further actuating piston 40' that is provided in addition to the actuating piston 40. The actuating piston 40' is not explicitly visible in FIGS. 1 through 4. In FIG. 1, at least one housing section of the brake caliper 20 is indicated in which the actuating piston 40' is accommodated. Reference numeral 40' is therefore assigned to this housing section, although it is intended to denote the actuating piston.

The actuating pistons 40, 40' are accommodated in the brake caliper 20 so as to be displaceable in the direction of their longitudinal axis 41 or 41', respectively, and thus displaceable, for example, in the direction of the center axis A. The actuating pistons 40, 40' are preferably situated on a vehicle inner portion 20.2 or section of the brake caliper 20. Two of the brake shoes 30, 30',31, 31', in particular the brake shoes 30, 30' associated with the brake side 22, are preferably respectively associated with one of the actuating pistons 40, 40', for example in such a way that upon actuation, the associated brake shoes 30, 30' are directly pressed against the brake disc 100 by the actuating pistons 40, 40'. The brake shoes 30, 30' are preferably guided on the brake carrier 10 via guides, so that the brake shoes 30, 30' may carry out a pressing motion against the brake disc 100. By means of the guides, the brake shoes 30, 30' are preferably supported on the brake carrier 10 against braking forces.

The other of the brake shoes 30, 30',31, 31', in particular the brake shoes 31, 31" associated with the brake side 23, are preferably situated on a vehicle outer portion or section 20.1 of the brake caliper 20. These brake shoes 31, 31' are preferably to be actuated by displacing the brake caliper 20, i.e., indirectly. For example, the brake shoes 31, 31' are held on a transverse yoke 37 of the brake caliper 20. The transverse yoke 37 may have multiple pin elements 38 that are used for supporting and/or guiding the associated brake shoes 31, 31'. The brake shoes 31, 31' are supported on the brake carrier 10 against braking forces via the connection of the brake caliper 20 to the brake carrier 10.

The brake shoes 30, 30',31, 31' preferably have the friction lining 32, 32',33, 33', respectively, that is mounted on a lining carrier 34, 34',35, 35', respectively, or a back plate. For example, for the brake shoes 30, 30' the respective lining carrier 34, 34' is movably guided on the brake carrier 10 by means of the guides. For example, for the brake shoes 31, 31' the respective lining carrier 35, 35' is held on the brake caliper 20, in particular the transverse yoke 37.

As is apparent in particular from FIGS. 2 and 3, the brake caliper 20 is displaceably guided on the brake carrier 10 by at least one, preferably two, guide elements 12, 13, in particular guide bolts. For this purpose, the guide elements 12, 13 are preferably situated between the brake shoes 30, 30' of the brake side 22 and between the brake shoes 31, 31' of the other brake side 23. For example, the actuating pistons 40, 40' are situated on the brake caliper 20 symmetrically with respect to an axial center plane D of the brake carrier 10. The guide elements 12, 13 are preferably situated in the axial center plane D, and in the radial direction are spaced apart from one another with respect to the center axis A of the disc brake 1 and extend, for example, parallel to the center axis A (FIGS. 1 and 3). For example, the guide elements 12, 13 are associated with the vehicle inner portion or section 20.2 of the brake caliper 20. For guiding and/or supporting the brake caliper 20 with respect to the brake carrier 10, a further guide element 14, for example a bolt element, may be provided that is associated with the vehicle outer portion or section 20.1 of the brake caliper 20.

The disc brake 1 has a service brake function. The actuating pistons 40, 40' are hydraulically actuated for this purpose. The actuating pistons 40, 40' are preferably designed as hollow pistons, and in each case have an interior space or cavity 42. In a pressure space 26 via an inlet 25, by means of a hydraulic fluid, a brake pressure is generated which moves the two actuating pistons 40, 40' in the direction according to the arrow Y. The brake shoes 30, 30' hereby come into contact with the brake disc 100 on its one outer side. Due to the "action=reaction" principle, the movement of the actuating pistons 40, 40' correspondingly moves the entire brake caliper 20 in the opposite direction, i.e., in the direction according to the arrow X (FIG. 1). The brake caliper 20, which overlaps the brake disc 100, thus brings the brake shoes 31 and 31' into contact with the brake disc 100 on its other outer side.

The interior space 42 of each actuating piston 40 or 40', utilized as a hydraulic chamber, is preferably sealed off with respect to the brake caliper 20 by means of a sealing element 43. The sealing element 43 may be a sealing ring that is mounted on the outer circumference of the associated actuating piston 40 or 40' and is supported against the wall of the inner circumference of the associated piston receptacle of the brake caliper 20.

The disc brake 1, in addition to the service brake function, also has a parking brake function or hand brake function that can also be used as an emergency brake function. For carrying out the parking brake function, one of the actuating pistons 40, 40', in particular the actuating piston 40, is actuatable by means of an electric motor 50. The electric motor 50 may in principle also be used so that the one actuating piston 40 is actuated by the fact that both types of actuation overlap; i.e., a hydraulic actuating force and a mechanical actuating force are simultaneously exerted on the actuating piston 40. The electric motor 50 is schematically illustrated in FIG. 1 by way of example.

The electric motor 50 is preferably situated between the actuating pistons 40 and 40', and a longitudinal axis 52 of the electric motor 50 and an output shaft 51 of the electric motor 50, and the longitudinal axis 41 of the actuating piston 40 are axially offset, for example situated axially parallel to one another. For example, the electric motor 50 engages with an open space 24 of the brake caliper 20 that is present, for example, between the actuating pistons 40 and 40'. The longitudinal axis 52 of the electric motor 50 and/or the output shaft 51 of the electric motor 50 preferably coincide(s) with the center axis A of the disc brake 1.

The electric motor 50 may be operatively connectable to the actuating piston 40 via a screw gear 53 in order to carry out the parking brake function. The screw gear 53 is preferably situated in the interior space 42 of the one actuating piston 40. For this purpose, the one actuating piston 40 is preferably open on one side, and with a closed side faces the associated brake side 22. The other actuating piston 40' may have a similar design and arrangement. In addition, the other actuating piston 40' with an open side may face the associated brake side 22.

The screw gear 53 may be designed as a spindle/nut arrangement. The spindle/nut arrangement has a threaded spindle 54 and a nut element 55 that meshes therewith. The threaded spindle 54 is displaceably fixed on the brake caliper 20, for example by means of a bearing 59, in the direction of a longitudinal axis 58 of the spindle/nut arrangement, and is supported so as to be rotatable about the longitudinal axis 58 of the spindle/nut arrangement. The nut element 55 is held so that by means of at least one securing element 57 and is rotatably fixed with respect to the actuating piston 40, and displaceable in the direction of the longitudinal axis 41 of the actuating piston 40. A rotational motion of the threaded spindle 54 as a function of its rotational direction is thus possible, via which the nut element 55 is translationally moved either into contact with the actuating piston 40 or away from the actuating piston 40. The threaded spindle 54 is preferably sealed off with respect to the brake caliper 20 by a sealing element 59.1, in particular a shaft seal, in order to ensure seal-tightness of the pressure space 26.

The nut element 55 with its outer circumferential surface is preferably at least partially guided on the inner circumference of the actuating piston 40. For example, an end area 56 of the nut element 55, in particular the end area 56 facing the associated brake shoe 30, is radially expanded and used as a guide surface with respect to the inner face of the actuating piston 40. The securing element 57 is preferably a bolt element or a pin element 38 which at one end is fastened to a wall section of the actuating piston 40, preferably provided within the interior space 42 of the actuating piston 40 and, for example, with its longitudinal axis 41 situated axially parallel to the longitudinal axis 58 of the actuating piston 40.

The electric motor 50 and the screw gear 53 are preferably in drive connection with one another via a reduction gear 60. For example, the reduction gear 53 [sic; 60] has a multi-stage, in particular a two-stage, design. The reduction gear 53 [sic; 60] may be a spur gear and/or belt gear. For example, the reduction gear 60 allows an overall reduction of the output shaft 51 of the electric motor 50 to the screw gear 53, in particular the threaded spindle 54, of approximately 200:1. The reduction gear 60 is preferably situated in the area of the vehicle-side end of the disc brake 1. For example, the reduction gear 60 connects the preferably axially parallel shafts, namely, the output shaft 51 of the electric motor 50 and the input shaft of the screw gear 53, in particular the threaded spindle 54, to one another.

In the present description, reference to a certain aspect or a certain embodiment or a certain configuration means that a certain feature or a certain property, described in conjunction with the particular aspect or the particular embodiment or the particular configuration, is at least contained therein, but does not necessarily have to be contained in all aspects or embodiments or configurations of the invention. It is expressly noted that any combination of the various features and/or structures and/or properties that are described with regard to the invention is encompassed by the invention, provided that the context does not explicitly or unambiguously indicate otherwise.

The use of single, or all, examples, or wording in the text by way of example is intended solely to elucidate the invention, and does not represent a limitation with regard to the scope of the invention, unless stated otherwise. In addition, no expression or wording of the description is to be construed in such a way that it involves an element that is not claimed, but is essential for the practice of the invention.

The invention claimed is:

1. A disc brake, comprising:
   a brake carrier,
   a brake caliper,
   a plurality of brake shoes, and
   an actuating piston,
   wherein the brake carrier has at least one mounting point for mounting on a vehicle, and the brake caliper is guided on the brake carrier and has a receiving space for a brake disc, and the receiving space has two brake sides with regard to the brake disc, wherein the brake shoes are associated with the brake sides and are supported on the brake carrier against braking forces, wherein guide elements are situated between the brake shoes of the respective brake side for displaceably guiding the brake caliper on the brake carrier;
   wherein the actuating piston in a direction of its longitudinal axis is displaceably accommodated on the brake caliper and is actuatable for carrying out a service brake function of the disc brake, and wherein the actuating piston is actuatable by means of an electric motor for carrying out a parking brake function of the disc brake, such that at least one further actuating piston is provided, which in a direction of its longitudinal axis is displaceably accommodated on the brake caliper, wherein for carrying out he service brake function the at least two actuating pistons are actuatable, and for carrying out the parking brake function, one of the actuating pistons is actuatable, wherein each of the actuating piston and the further actuating piston is an unopposed piston, and
   wherein at least two of the brake shoes are spaced apart from one another on both brake sides, and one of the actuating pistons is in each case associated with the brake shoes of one of the brake sides.

2. The disc brake according to claim 1 wherein the electric motor is operatively connectable to the actuating piston via a screw gear in order to carry out the parking brake function.

3. The disc brake according to claim 2 wherein the screw gear has a spindle/nut arrangement, and has a threaded spindle and a nut element that meshes therewith.

4. The disc brake according to wherein the threaded spindle is displaceably fixed with respect to the brake caliper in a direction of a longitudinal axis of the spindle/nut arrangement and is rotatable about the longitudinal axis of the spindle/nut arrangement, and the nut element is rotationally fixed with respect to the actuating piston and is displaceable in the direction of the longitudinal axis of the actuating piston, so that the nut element is translationally moved either into contact with the actuating piston or away from the actuating piston due to a rotational motion of the threaded spindle, depending on its rotational direction.

5. The disc brake according to wherein the nut element is displaceably fixed with respect to the brake caliper in the direction of the longitudinal axis of the spindle/nut arrangement and is rotatable about the longitudinal axis of the spindle/nut arrangement, and the threaded spindle is rotatably fixed with respect to the actuating piston and is displaceable in the direction of the longitudinal axis of the actuating piston, so that the threaded spindle is translationally moved either into contact with the actuating piston or away from the actuating piston due to a rotational motion of the nut element, depending on its rotational direction.

6. The disc brake according to claim 3 wherein the thread of the spindle/nut arrangement is self-locking.

7. The disc brake according to claim 2 wherein the actuating piston is designed as a hollow piston that is open on one side, and that with a closed side faces the associated brake side, and the screw gear is at least partially situated in an interior space of the actuating piston.

8. The disc brake according to claim 7 wherein the service brake function of the disc brake is carried out by hydraulic actuation of the actuating pistons, and the interior space of the actuating piston forms a hydraulic chamber.

9. The disc brake according to claim 2 wherein the electric motor and the screw gear are in drive connection with one another via a reduction gear.

10. The disc brake according to claim 1, wherein, on at least one of the brake sides, at least two of the brake shoes are spaced apart from one another.

11. The disc brake according to claim 1 wherein the actuating pistons are situated on the brake caliper symmetrically with respect to an axial center plane of the brake carrier, and the guide elements are situated in the axial center plane and spaced apart from one another in the radial direction with respect to a center axis of the disc brake.

12. The disc brake according to claim 1 wherein the electric motor is situated between the actuating pistons, and at least one of a longitudinal axis of the electric motor and an output shaft of the electric motor is axially offset from the longitudinal axis of the actuating piston that is actuatable by the electric motor.

13. The disc brake according to claim 1 wherein the electric motor is positioned in an open space between the actuating pistons.

14. The disc brake according to claim 1 wherein the longitudinal axis of the electric motor and/or the output shaft of the electric motor coincide with the center axis of the disc brake.

15. A disc brake, comprising:
a brake carrier for mounting on a vehicle,
a brake caliper connected to the brake carrier and having a space configured to receive a brake disc;
first and second pairs of spaced-apart brake shoes supported on the brake carrier and the brake caliper such that the brake disc extends between the first pair of brake shoes and between the second pair of brake shoes,
a first unopposed actuating piston aligned with the first pair of brake shoes and axially movable within the brake carrier,
a motor actuatable to move the first unopposed actuating piston towards the first pair of brake shoes;
a second unopposed actuating piston aligned with the second pair of brake shoes and axially movable within the brake carrier, wherein both the first and second unopposed actuating pistons are actuatable to move the first and second pairs of brake shoes into engagement with the brake disc to apply the service brake, and wherein only one of the first and second unopposed actuating pistons is actuatable to move the respective first or second pair of brake shoes into engagement with the brake disc to apply the parking brake; and
guide elements situated between the brake shoes of the respective brake side for displaceably guiding the brake caliper on the brake carrier, wherein at least two of the brake shoes are spaced apart from one another on both brake sides, and one of the actuating pistons is in each case associated with the brake shoes of one of the brake sides.

* * * * *